(12) United States Patent
Koyama et al.

(10) Patent No.: US 12,286,095 B2
(45) Date of Patent: Apr. 29, 2025

(54) HYBRID SYSTEM

(71) Applicant: KUBOTA CORPORATION, Osaka (JP)

(72) Inventors: Kazuaki Koyama, Sakai (JP); Ryota Kimura, Sakai (JP); Koichi Funaki, Sakai (JP); Yasuo Fujii, Sakai (JP); Tamotsu Kuno, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 255 days.

(21) Appl. No.: 18/000,005

(22) PCT Filed: Oct. 22, 2021

(86) PCT No.: PCT/JP2021/039180
§ 371 (c)(1),
(2) Date: Nov. 28, 2022

(87) PCT Pub. No.: WO2022/113596
PCT Pub. Date: Jun. 2, 2022

(65) Prior Publication Data
US 2023/0202455 A1  Jun. 29, 2023

(30) Foreign Application Priority Data

Nov. 27, 2020  (JP) ................................. 2020-197608
Nov. 27, 2020  (JP) ................................. 2020-197609

(51) Int. Cl.
*B60W 20/16* (2016.01)
*B60W 10/06* (2006.01)
(Continued)

(52) U.S. Cl.
CPC ............ *B60W 20/16* (2016.01); *B60W 10/06* (2013.01); *B60W 10/08* (2013.01); *B60W 30/182* (2013.01); *B60W 2710/0666* (2013.01)

(58) Field of Classification Search
CPC ...................................................... B60W 20/16
See application file for complete search history.

(56) References Cited

U.S. PATENT DOCUMENTS 11,247,659 B2 * 2/2022 Asai ...................... B60K 6/387
11,919,504 B2 * 3/2024 Mizuguchi ............... B60K 6/48
(Continued)

FOREIGN PATENT DOCUMENTS

CN      111 645 666 A     9/2020
DE  11 2013 005708 T5     9/2015
(Continued)

*Primary Examiner* — Michael A Berns
(74) *Attorney, Agent, or Firm* — Muncy, Geissler, Olds & Lowe, P.C.

(57) ABSTRACT

A hybrid system which can calculate various type of more proper required torques is provided while input factors which can be used for calculating the various types of required torques are limited.

A hybrid system 2 includes a rotation sensor 31 which detects a rotation number of an engine 3, at least either one of an accelerator opening-degree sensor 61 which detects an accelerator opening degree and a rotation-number instruction unit 62 which transmits a rotation-number signal instructing a certain rotation number to the engine 3, and a control unit 5 which controls an operation of the engine 3. The control unit 5 executes control of calculating a torque determining factor for determining a system required torque as the hybrid system 2 on the basis of at least either one of the accelerator opening degree detected by the accelerator opening-degree sensor 61 and the rotation-number signal transmitted by the rotation-number instruction unit 62 and control of calculating the system required torque on the basis of the rotation number detected by the rotation sensor 31 and the calculated torque determining factor.

15 Claims, 7 Drawing Sheets

(51) Int. Cl.
  *B60W 10/08*   (2006.01)
  *B60W 30/182*  (2020.01)

(56) References Cited

U.S. PATENT DOCUMENTS

| | | | | |
|---|---|---|---|---|
| 2023/0202455 A1* | 6/2023 | Koyama | ........... | B60W 30/1884 |
| | | | | 701/22 |
| 2023/0398851 A1* | 12/2023 | Arakawa | .................. | B60K 6/36 |
| 2023/0398853 A1* | 12/2023 | Arakawa | .................. | B60K 6/48 |

FOREIGN PATENT DOCUMENTS

| | | | |
|---|---|---|---|
| JP | 2003-027985 | A | 1/2003 |
| JP | 2005-094865 | A | 4/2005 |
| JP | 2014-129078 | A | 7/2014 |
| JP | 2016-107669 | A | 6/2016 |

* cited by examiner

| | LOW← [ENGINE ROTATION NUMBER] →HIGH | | | | | | | | |
|---|---|---|---|---|---|---|---|---|---|
| | | R1 | R2 | R3 | R4 | R5 | R6 | R7 | R8 | R9 |
| →SMALL [FUEL INJECTION AMOUNT] LARGE← | Q1 | T11 | T21 | T31 | T41 | T51 | T61 | T71 | T81 | T91 |
| | Q2 | T12 | T22 | T32 | T42 | T52 | T62 | T72 | T82 | T92 |
| | Q3 | T13 | T23 | T33 | T43 | T53 | T63 | T73 | T83 | T93 |
| | Q4 | T14 | T24 | T34 | T44 | T54 | T64 | T74 | T84 | T94 |
| | Q5 | T15 | T25 | T35 | T45 | T55 | T65 | T75 | T85 | T95 |
| | Q6 | T16 | T26 | T36 | T46 | T56 | T66 | T76 | T86 | T96 |
| | Q7 | T17 | T27 | T37 | T47 | T57 | T67 | T77 | T87 | T97 |
| | Q8 | T18 | T28 | T38 | T48 | T58 | T68 | T78 | T88 | T98 |
| | Q9 | T19 | T29 | T39 | T49 | T59 | T69 | T79 | T89 | T99 |

522

HYBRID SYSTEM

TECHNICAL FIELD

The present invention relates to a hybrid system mounted on an industrial machine.

BACKGROUND ART

In a hybrid system mounted on a hybrid vehicle, for example, a control unit (ECU: Electronic Control Unit) calculates a required torque as a hybrid system in order to determine an operation mode of the hybrid system. As the operation mode of the hybrid system, a torque split operation, a torque assist operation, a regeneration operation and the like can be cited, for example.

The torque split operation is an operation which brings a charging rate of a battery closer to a target value by distributing a torque of an engine and a torque of a motor generator. The torque assist operation is an operation in which the motor generator assists the engine torque. The regeneration operation is an operation in which fuel injection of the engine is stopped, and the battery is charged by the motor generator.

PTL 1 discloses a hybrid vehicle including a hybrid system having an electric generator connected to a battery and an engine and control means which controls the hybrid system. In the hybrid vehicle described in PTL 1, the control means works out an increase rate of a fuel consumption amount with respect to an output torque in the engine on the basis of a required torque to the engine calculated from measured values of a rotation sensor which measures an engine rotation number of the engine and an accelerator opening-degree sensor which measures an opening degree of an accelerator in the hybrid vehicle and on the basis of map data set in advance. And when a maximum value of the increase rate of the fuel consumption amount exceeds a threshold value set in advance, the control means executes control such that the assist of the engine by the electric generator is started with a maximum allowable drive output of the electric generator at a measured value of a temperature sensor.

In the hybrid system of an automobile as disclosed in PTL 1, for example, the required torque as the hybrid system is calculated on the basis not only of an engine required torque based on an accelerator pedal input (in other words, an accelerator opening degree) but also of a required torque for each component such as a transmission, an air conditioner and the like. In order to implement the calculation of the required torque as the hybrid system as above, each ECU provided for each component calculates a required torque for each component.

However, in industrial machines such as a construction machine, an agricultural machine, a lawnmower, a generator, a compressor, a pump and the like, a configuration of an accelerator is different for each application. For example, there is an industrial machine of such a model that does not include an accelerator pedal. In the industrial machine of the model that does not include an accelerator pedal, an operator instructs a certain engine rotation number not by the accelerator pedal but by a dial switch called a hand accelerator or the like in order to perform a work at a certain engine rotation number. Moreover, in the industrial machines, a relatively few components other than the engine have ECU, and the required torques of the components other than the engine are not known in relatively many cases. As described above, in the hybrid system mounted on the industrial machines, there is a problem that input factors which can be used when the required torque as the hybrid system is calculated or input factors which can be used when the required torque as the hybrid system is calculated and can be used when an operation mode of the hybrid system is determined are limited, as compared with the hybrid system mounted on automobiles.

CITATION LIST

Patent Literature

[PTL 1] Japanese Patent Application Publication No. 2016-107669

SUMMARY OF INVENTION

Technical Problem

The present invention has been made in order to solve the aforementioned problem and has an object to provide a hybrid system which can calculate various types of more proper required torques when input factors which can be used when the various types of required torques are calculated are limited. Alternatively, it has an object to provide a hybrid system which can determine more proper operation mode while the input factors which can be used when the operation mode is determined are limited.

Solution to Problem

The aforementioned problem is solved by a hybrid system according to the present invention mounted on an industrial machine, the hybrid system including a rotation sensor which detects a rotation number of an engine, at least either one of an accelerator opening-degree sensor which detects an accelerator opening degree and a rotation-number instruction unit which transmits a rotation-number signal instructing the certain rotation number to the engine, and a control unit which controls an operation of the engine, characterized in that the control unit executes control of calculating a torque determining factor for determining a system required torque as the hybrid system on the basis of at least either one of the accelerator opening degree detected by the accelerator opening-degree sensor and the rotation-number signal transmitted by the rotation-number instruction unit, and control of calculating the system required torque on the basis of the rotation number detected by the rotation sensor and the calculated torque determining factor.

According to the hybrid system according to the present invention, the control unit calculates the torque determining factor for determining the system required torque as the hybrid system on the basis of at least either one of the accelerator opening degree detected by the accelerator opening-degree sensor and the rotation-number signal transmitted by the rotation-number instruction unit. That is, the control unit can calculate the torque determining factor on the basis of the accelerator opening degree detected by the accelerator opening-degree sensor, can calculate the torque determining factor on the basis of the rotation-number signal which is transmitted by the rotation-number instruction unit and instructs a certain rotation number to the engine, and can calculate the torque determining factor on the basis of both the accelerator opening degree and the rotation-number signal. And the control unit calculates the system required torque as the hybrid system on the basis of the engine rotation number detected by the rotation sensor and the calculated torque determining factor. Thus, even if the hybrid system is mounted on the industrial machine not including an accelerator pedal, for example, or even if the control unit is not installed on the components other than the engine, the control unit of the present invention can calculate more proper system required torque. As a result, the hybrid system according to the present invention can calculate the more proper system required torque while the input factors which can be used when calculating the system required torque are limited.

In the hybrid system according to the present invention, the torque determining factor is preferably characterized to be a fuel injection amount of the engine.

According to the hybrid system according to the present invention, the control unit calculates the fuel injection amount of the engine on the basis of at least either one of the accelerator opening degree detected by the accelerator opening-degree sensor and the rotation-number signal transmitted by the rotation-number instruction unit. And the control unit calculates the system required torque as the hybrid system on the basis of the rotation number of the engine detected by the rotation sensor and the calculated fuel injection amount of the engine. Thus, the hybrid system according to the present invention can calculate the more proper system required torque while the input factors which can be used when calculating the system required torque are limited.

In the hybrid system according to the present invention, the control unit is preferably characterized by correcting the calculated fuel injection amount and by calculating an engine required torque for the engine on the basis of the rotation number detected by the rotation sensor and the fuel injection amount after the correction.

According to the hybrid system according to the present invention, the control unit corrects the fuel injection amount and calculates the engine required torque on the basis of the rotation number of the engine detected by the rotation sensor and the fuel injection amount after the correction. As a result, while reducing particulate matters (PM: Particulate Matter) contained in an exhaust gas, the torque assist operation can be performed when the rotation number of the engine is lowered due to an overload or a rapid acceleration response is required.

In the hybrid system according to the present invention, the control unit is preferably characterized by storing, in advance, map data indicating a relationship among the rotation number of the engine, the fuel injection amount, and the torque of the engine and by calculating the system required torque on the basis of the map data stored in advance.

According to the hybrid system according to the present invention, since the control unit calculates the system required torque on the basis of the map data stored in advance, it can calculate the more proper system required torque while reducing processing time for calculating the system required torque.

In the hybrid system according to the present invention, the control unit is preferably characterized by storing, in advance, map data indicating a relationship among the rotation number of the engine, the fuel injection amount, and the torque of the engine and by calculating the engine required torque on the basis of the map data stored in advance.

According to the hybrid system according to the present invention, since the control unit calculates the engine required torque on the basis of the map data stored in advance, it can calculate the more proper engine required torque while reducing processing time for calculating the engine required torque.

In the hybrid system according to the present invention, the control unit is preferably characterized by calculating the system required torque, which is larger than a torque generated only by the engine.

According to the hybrid system according to the present invention, the control unit can perform the torque assist operation and can generate the system required torque larger than the torque generated only by the engine, even when the rotation number of the engine is relatively low. As a result, fuel efficiency can be improved while suppressing an emission of the engine, and reducing particulate matters contained in the exhaust gas.

The aforementioned problem is solved by the hybrid system according to the present invention, which is a hybrid system mounted on an industrial machine and includes a rotation sensor which detects a rotation number of an engine, at least either one of an accelerator opening-degree sensor which detects an accelerator opening degree and a rotation-number instruction unit which transmits a rotation-number signal instructing the certain rotation number to the engine, and a control unit which controls an operation of the engine, characterized in that the control unit executes control of calculating a torque determining factor for determining a system required torque as the hybrid system on the basis of at least either one of the accelerator opening degree detected by the accelerator opening-degree sensor and the rotation-number signal transmitted by the rotation-number instruction unit, control of calculating the system required torque and the engine required torque for the engine on the basis of the rotation number detected by the rotation sensor and the calculated torque determining factor, and control of determining an operation mode on the basis of the relationship between the system required torque and the engine required torque.

According to the hybrid system according to the present invention, the control unit calculates the torque determining factor for determining the system required torque as the hybrid system on the basis of at least either one of the accelerator opening degree detected by the accelerator opening-degree sensor and the rotation-number signal transmitted by the rotation-number instruction unit. That is, the control unit can calculate the torque determining factor on the basis of the accelerator opening degree detected by the accelerator opening-degree sensor, can calculate the torque determining factor on the basis of the rotation-number signal which is transmitted by the rotation-number instruction unit and instructs a certain rotation number to the engine and can also calculate the torque determining factor on the basis of both the accelerator opening degree and the rotation-number signal. And the control unit calculates the system required torque as the hybrid system and the engine required torque for the engine on the basis of the engine rotation number detected by the rotation sensor and the calculated torque determining factor and executes control of determining the operation mode on the basis of the system required torque and the engine required torque. Thus, even if the hybrid system is mounted on the industrial machine not including an accelerator pedal, for example, or even if the control unit is not installed in the components other than the engine, the control unit of the present invention can calculate the more proper system required torque and engine required torque and can determine the more proper operation mode on the basis of the relationship between the system required torque and the engine required torque. As a result, the hybrid system according to the present invention can determine the more proper operation mode while the input factors which can be used when determining the operation mode are limited.

In the hybrid system according to the present invention, the torque determining factor is preferably characterized to be a fuel injection amount of the engine.

According to the hybrid system according to the present invention, the control unit calculates the fuel injection amount of the engine on the basis of at least either one of the accelerator opening degree detected by the accelerator opening-degree sensor and the rotation-number signal transmitted by the rotation-number instruction unit. And the control unit executes control of calculating the system required torque and the engine required torque for the engine as the hybrid system on the basis of the rotation number of the engine detected by the rotation sensor and the calculated fuel injection amount of the engine and of determining the operation mode on the basis of the relationship between the system required torque and the engine required torque. Thus, the hybrid system according to the present invention can determine the more proper operation mode while the input factors which can be used when determining the operation mode are limited.

In the hybrid system according to the present invention, the control unit is preferably characterized by correcting the calculated fuel injection amount and by calculating the engine required torque on the basis of the rotation number detected by the rotation sensor and the fuel injection amount after the correction.

According to the hybrid system according to the present invention, the control unit corrects the fuel injection amount and calculates the engine required torque on the basis of the rotation number of the engine detected by the rotation sensor and the fuel injection amount after the correction. As a result, while reducing the particulate matters (PM: Particulate Matter) contained in an exhaust gas, the torque assist operation can be performed as the more proper operation mode, when the rotation number of the engine is lowered due to an overload or a rapid acceleration response is required.

In the hybrid system according to the present invention, the control unit is preferably characterized by storing, in advance, map data indicating the relationship among the rotation number of the engine, the fuel injection amount, and the torque of the engine and by calculating the system required torque and the engine required torque on the basis of the map data stored in advance.

According to the hybrid system according to the present invention, since the control unit calculates the system required torque and the engine required torque on the basis of the map data stored in advance, it can calculate the more proper system required torque and engine required torque while reducing processing time for calculating the system required torque and the engine required torque.

In the hybrid system according to the present invention, the control unit is preferably characterized by executing control of determining the operation mode further on the basis of a charging rate of a battery connected to the motor generator.

According to the hybrid system according to the present invention, the control unit executes control of determining the operation mode on the basis not only of the relationship between the system required torque and the engine required torque but further of the charging rate of the battery connected to the motor generator. Therefore, the hybrid system according to the present invention can determine the more proper operation mode while the input factors which can be used when determining the operation mode are limited.

In the hybrid system according to the present invention, the control unit is preferably characterized in that, when the system required torque is smaller than a first threshold value, and the charging rate is smaller than a second threshold value, the engine required torque is set to zero, and the motor required torque for the motor generator is calculated, and a regeneration operation for charging the battery by the motor generator is determined to be the operation mode.

According to the hybrid system according to the present invention, the control unit calculates the motor required torque for the motor generator on the basis of the relationship between the system required torque and the engine required torque and the charging rate of the battery and can execute the regeneration operation as the more proper operation mode.

In the hybrid system according to the present invention, the control unit is preferably characterized in that, when the system required torque is larger than the engine required torque, and when the charging rate is larger than the second threshold value, the motor required torque for the motor generator is calculated on the basis of a difference between the system required torque and the engine required torque, and the torque assist operation, in which the motor generator assists a torque of the engine is determined, to be the operation mode.

According to the hybrid system according to the present invention, the control unit calculates the motor required torque for the motor generator on the basis of the relationship between the system required torque and the engine required torque and of the charging rate of the battery and can execute the torque assist operation as the more proper operation mode.

In the hybrid system according to the present invention, the control unit is preferably characterized in that, at least in either one of a case when the system required torque is equal to or less than the engine required torque, and a case when the charging rate is equal to or less than the second threshold value, the motor required torque for the motor generator is calculated in accordance with the charging rate, and a torque split operation for bringing the charging rate closer to a target value by distributing the torque of the engine and the torque of the motor generator is determined to be the operation mode.

According to the hybrid system according to the present invention, the control unit calculates the motor required torque for the motor generator on the basis of the relationship between the system required torque and the engine required torque and of the charging rate of the battery and can execute the torque split operation as the more proper operation mode.

In the hybrid system according to the present invention, the control unit is preferably characterized by calculating the system required torque, which is larger than a torque generated only by the engine.

According to the hybrid system according to the present invention, the control unit executes the torque assist operation as the more proper operation mode and can generate the system required torque larger than the torque generated only by the engine, even when the rotation number of the engine is relatively low. As a result, improvement of the fuel consumption can be promoted while suppressing the emission of the engine, and reducing the particulate matters contained in the exhaust gas.

Advantageous Effects of Invention

According to the present invention, while the input factors which can be used when calculating various required torques are limited, the hybrid system which can calculate the more proper various required torques can be provided. Moreover, according to the present invention, while the input factors which can be used when determining the operation mode are limited, the hybrid system which can determine the more proper operation mode can be provided.

DESCRIPTION OF EMBODIMENTS

Hereinafter, preferred embodiments of the present invention will be described in detail by referring to the figures.

The embodiments described below are preferred specific examples of the present invention and thus, various technically preferable limitations are given, but a scope of the present invention is not limited to these modes unless it is particularly described that the present invention is limited in the following description. Moreover, in each of the drawings, the same signs are given to the similar constituent elements, and detailed description will be omitted as appropriate.

Figure 1:
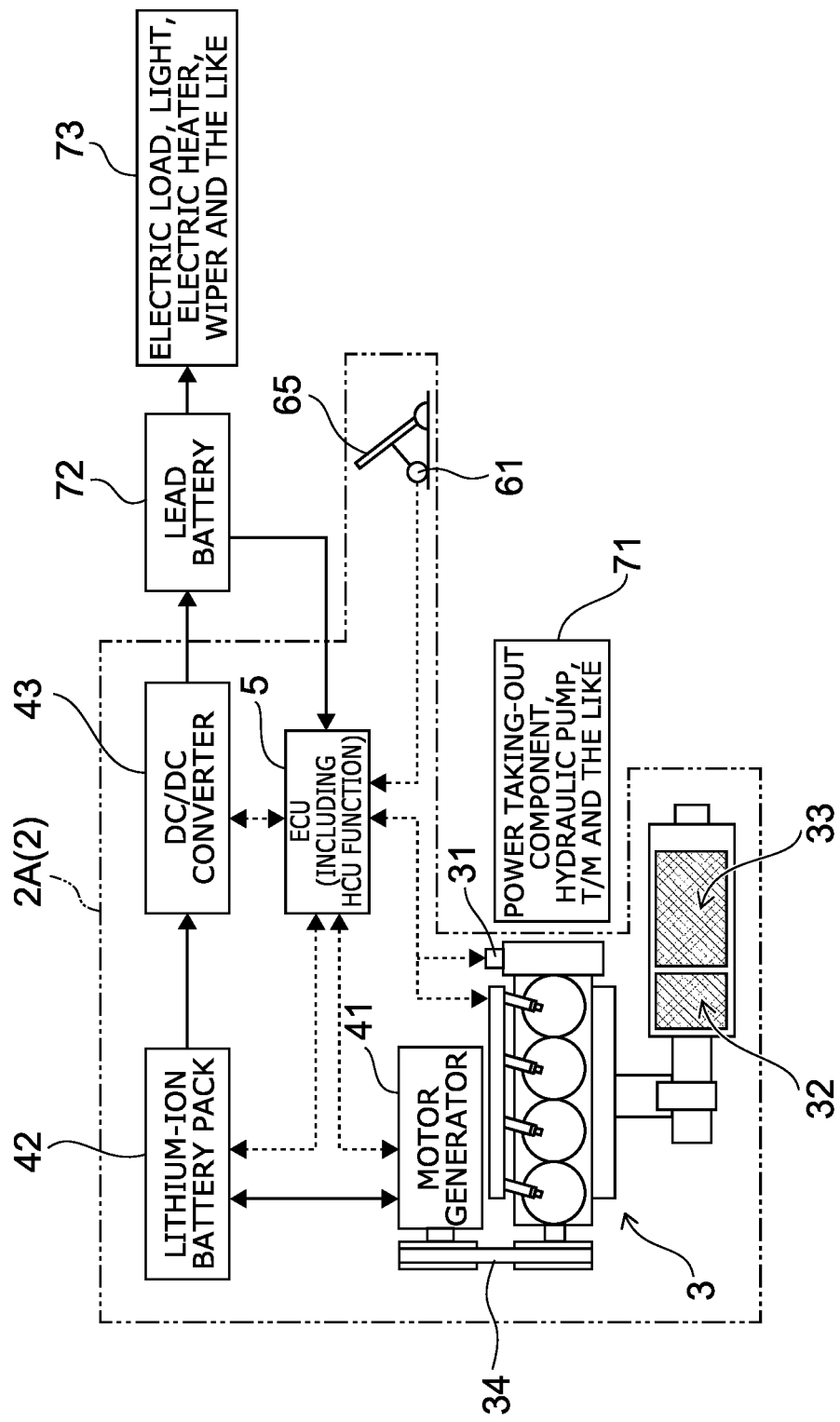
FIG. 1 is a block diagram illustrating a hybrid system according to a first embodiment of the present invention.

FIG. 1 is a block diagram illustrating a hybrid system according to a first embodiment of the present invention.

A hybrid system 2A according to this embodiment is mounted on industrial machine such as a construction machine, an agricultural machine, a lawnmower, a generator, a compressor, a pump or the like, for example. As shown in FIG. 1, the industrial machine on which the hybrid system 2A according to this embodiment is mounted is a machine having an accelerator pedal 65 so that a rotation number of an engine 3 is made variable by the accelerator pedal 65. The hybrid system 2A includes the engine 3, a motor generator 41, a battery pack 42, a DC/DC converter 43, a control unit 5, and an accelerator opening-degree sensor 61.

The engine 3 is an internal combustion engine, that is, an industrial engine such as an industrial diesel engine, an industrial gasoline engine, an industrial gas engine and the like, for example. The engine 3 is a multicylinder engine such as a supercharging type high-output 3-cylinder engine, a 4-cylinder engine and the like with a turbocharger, for example. As shown in FIG. 1, the engine 3 has a rotation sensor 31, a DOC (Diesel Oxidation Catalyst) 32, and a DPF (Diesel Particulate Filter) 33. However, the engine 3 is not limited to the configuration shown in FIG. 1 but does not have to include the DOC or the DPF. Moreover, the engine 3 only needs to be configured such that fuel injection is electronically controlled, not limited to a common rail, but a governor maybe electronically controlled.

The rotation sensor 31 detects the rotation number of the engine 3 and transmits a voltage signal related to the rotation number of the engine 3 to the control unit 5 via a CAN (Controller Area Network) communication line. The control unit 5 converts the received voltage signal related to the rotation number of the engine 3 to the rotation number. Power generated in the engine 3 is transmitted to power taking-out components 71 such as a hydraulic pump, a transmission (T/M) and the like of the industrial machine.

The motor generator 41 is an AC power generator and is connected to the engine 3 through a transmission member 34 such as a V-belt or the like. The motor generator 41 is driven by power generated in the engine 3 and transmitted through the transmission member 34 and generates electricity. Moreover, when the rotation number of the engine is lowered due to an overload or when rapid acceleration response is required, for example, the motor generator 41 generates a rotary force by power supplied from the battery pack 42, transmits the rotary force to the engine 3 through the transmission member 34, and assists or supports a torque of the engine 3. Details thereof will be described later.

The battery pack 42 is a lithium-ion battery, for example, and is electrically connected to the motor generator 41. The battery pack 42 of this embodiment is an example of the "battery" of the present invention. The battery pack 42 is electrically connected to the motor generator 41 by a 48-V system line, for example, and stores electricity generated by the motor generator 41. That is, the battery pack 42 performs charging by power generation of the motor generator 41. Moreover, the battery pack 42 supplies the stored electricity to the motor generator 41. That is, the battery pack 42 discharges when the motor generator 41 requires electricity and supplies power to the motor generator 41.

The DC/DC converter 43 is electrically connected to the battery pack 42 by a high-voltage system line such as 48V or 24V, for example, and converts a high-voltage DC current discharged from the battery pack 42 to a low-voltage DC current such as 12V. Moreover, the DC/DC converter 43 is electrically connected to a lead battery 72 by a low-voltage system line, for example. The electricity which was converted by the DC/DC converter 43 from the high-voltage DC current to the low-voltage DC current is stored in the lead battery 72. The electricity stored in the lead battery 72 is supplied to an electric load 73 such as a light, an electric heater, a wiper and the like of the industrial machine.

As described above, the industrial machine on which the hybrid system 2A according to this embodiment is mounted has the accelerator pedal 65. The accelerator opening-degree sensor 61 (or accelerator sensor)_detects an input of the accelerator pedal 65, that is, an accelerator opening degree and transmits a signal related to the accelerator opening degree to the control unit 5 by the CAN communication line. The input of the accelerator pedal 65 is determined by how much the pedal is operated by the operator. The input may be referred to as an operation amount of the accelerator pedal.

The control unit 5 includes an ECU (electronic control unit or engine control unit) and an HCU (Hybrid Control Unit: hybrid control unit) and controls the hybrid system 2A. The HCU may be provided integrally with the ECU or may be provided separately from the ECU.

The control unit 5 performs calculation by acquiring various types of information or by receiving various signals, generates control signals which control operations of components such as the engine 3, the motor generator 41, the battery pack 42 and the like, and transmit them to each component by electric communication lines including the CAN. For example, the control unit 5 gives drive instructions to each component by transmitting the control signal to each component by the electric communication line by calculating a fuel injection amount of the engine 3, by calculating a target air amount of the engine 3, by determining the operation mode of the hybrid system 2A, or by determining a control parameter of the engine 3.

The operation modes of the hybrid system 2A include, for example, a torque split operation, a torque assist operation, a regeneration operation and the like. The torque split operation is an operation of distributing the torque of the engine 3 and the torque of the motor generator 41 so as to bring the charging rate of the battery pack 42 to a target value. The torque assist operation is an operation in which the motor generator 41 assists or supports the torque of the engine 3. The regeneration operation is an operation of stopping fuel injection of the engine 3 and of charging the battery pack 42 by the motor generator 41. Details of the operation modes of the hybrid system 2A will be described later.

Figure 2:
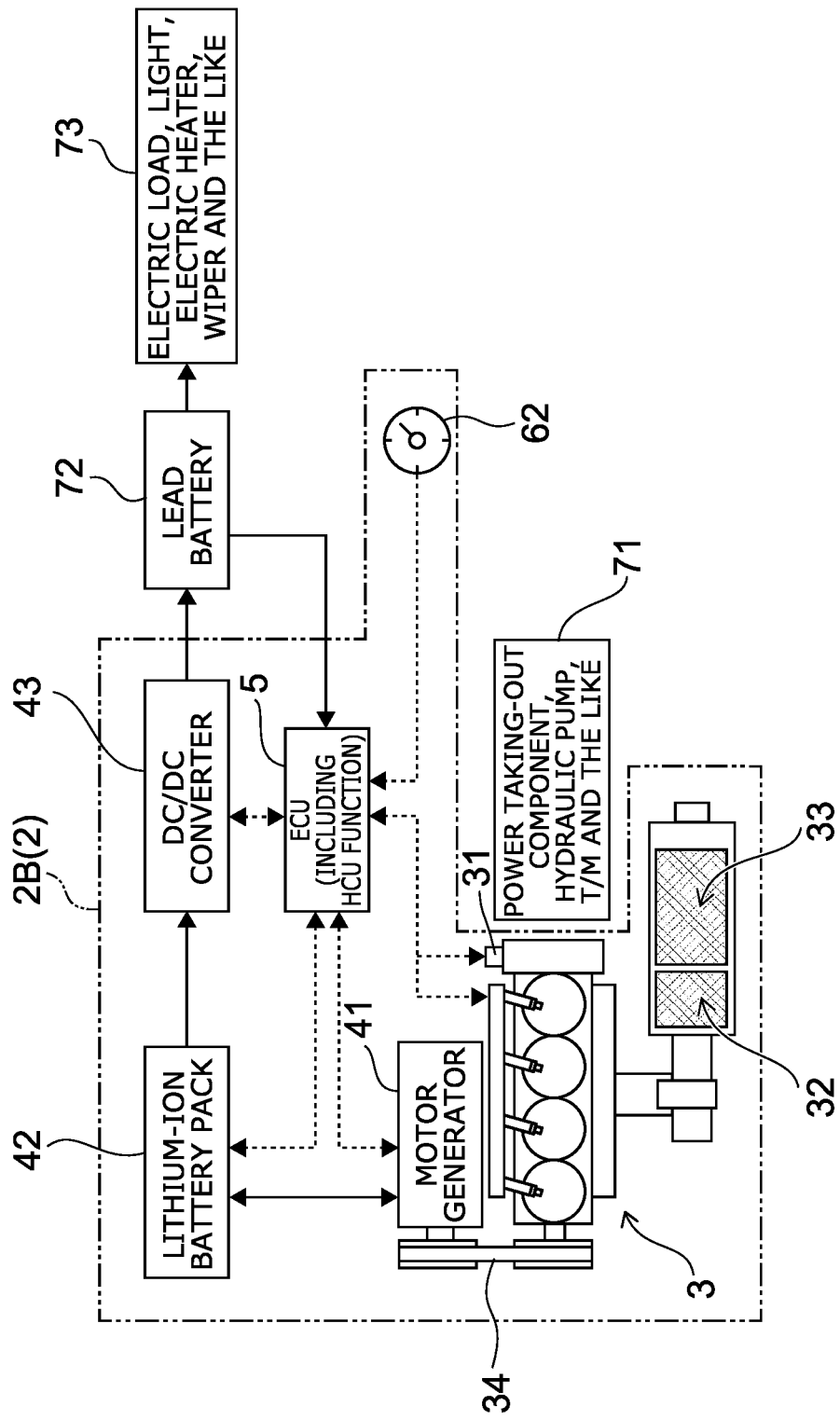
FIG. 2 is a block diagram illustrating a hybrid system according to a second embodiment of the present invention.

FIG. 2 is a block diagram illustrating a hybrid system according to a second embodiment of the present invention.

When constituent elements of the hybrid system 2B according to the second embodiment are similar to the constituent elements of the hybrid system 2A according to the first embodiment described above in relation with FIG. 1, duplicated description will be omitted as appropriate, and mainly differences will be described below.

The hybrid system 2B according to this embodiment is, similarly to the hybrid system 2A described above in relation with FIG. 1, mounted on industrial machine such as a construction machine, an agricultural machine, a lawnmower, a generator, a compressor, a pump or the like, for example. As shown in FIG. 2, the industrial machine on which the hybrid system 2B according to this embodiment is mounted is a machine having a hand accelerator 62 instead of the accelerator pedal 65 so that a rotation number of an engine 3 is set to a certain level by the hand accelerator 62.

An operator of the industrial machine on which the hybrid system 2B is mounted gives an instruction of a certain engine rotation number by the hand accelerator 62 in order to perform a work at the certain engine rotation number. The hand accelerator 62 is a dial switch, for example, and receives the certain rotation number of the engine 3 input by the operator in accordance with an operation of the operator to the hand accelerator 62 and transmits a rotation-number signal instructing the certain rotation number of the engine 3 to the control unit 5 by the CAN communication line. The hand accelerator 62 of this embodiment is an example of a "rotation-number instruction unit" of the present invention. The "rotation-number instruction unit" of the present invention is not limited only to the hand accelerator 62.

The other constituent elements are similar to the constituent elements of the hybrid system 2A according to the first embodiment described above in relation with FIG. 1.

In the following description, for convenience of explanation, the hybrid system 2A according to the first embodiment and the hybrid system 2B according to the second embodiment are called the "hybrid system 2" as a concept containing the both in some cases. As described in relation with FIG. 1 and FIG. 2, the hybrid system 2 according to this embodiment is mounted on an industrial machine of a model including the accelerator pedal 65 or is mounted on an industrial machine of a model not including the accelerator pedal 65 (in other words, a model including the hand accelerator 62) depending on the case. Moreover, the hybrid system 2 according to this embodiment may be mounted on an industrial machine of a model including both the accelerator pedal 65 and the hand accelerator 62.

Subsequently, the control unit 5 of this embodiment will be further described by referring to the figures.

Figure 3:
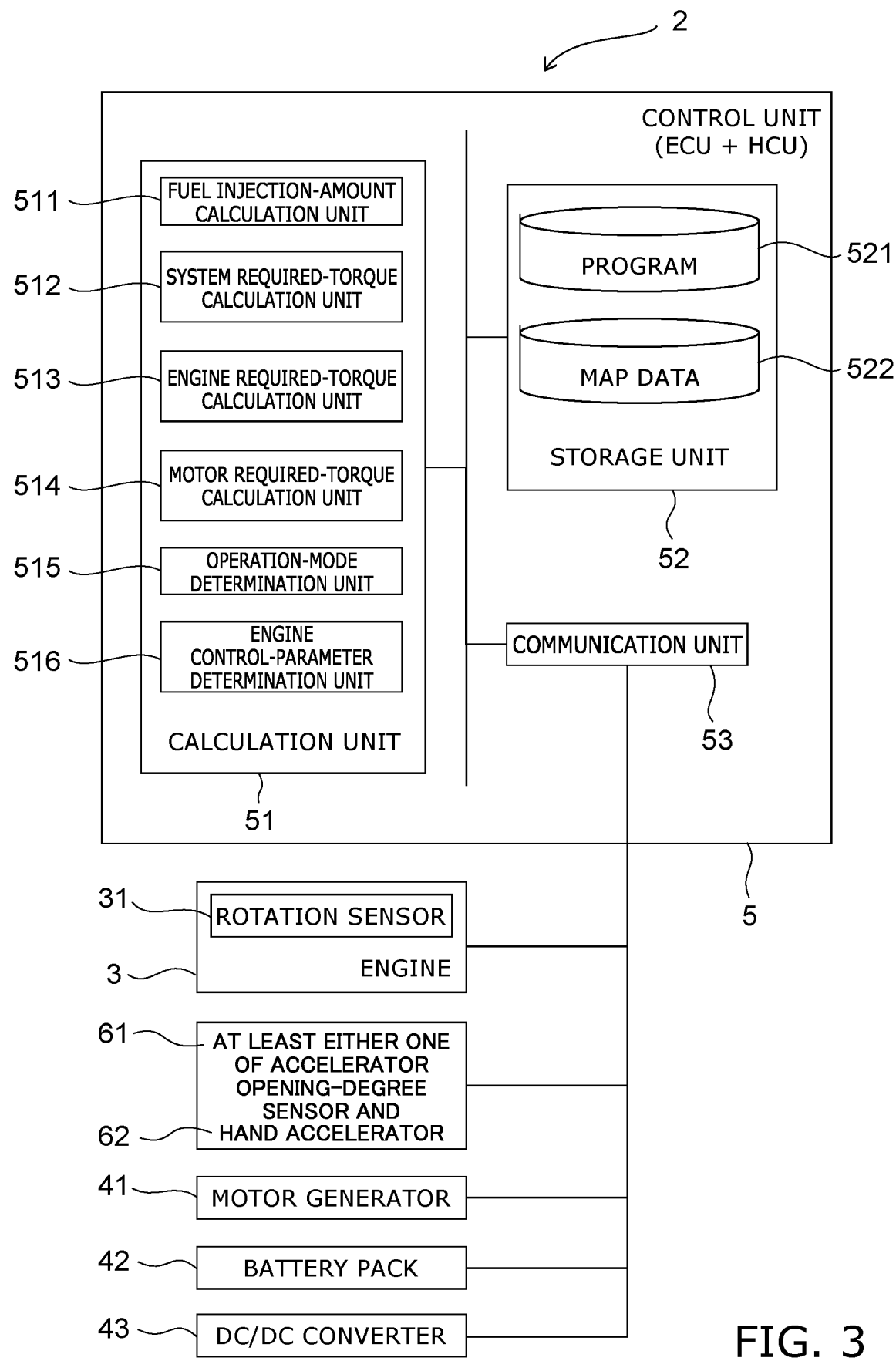
FIG. 3 is a block diagram illustrating an essential-part configuration of the hybrid system according to this embodiment.

FIG. 3 is a block diagram illustrating an essential part configuration of the hybrid system according to this embodiment.

The control unit 5 of this embodiment has a calculation unit 51, a storage unit 52, and a communication unit 53. The calculation unit 51 executes various calculations and processing by reading out a program 521 stored in the storage unit 52. The storage unit 52 stores (holds in a storage) the program 521 executed by the calculation unit 51 and map data 522 used when the system required torque and the engine required torque, which will be described later, are to be calculated. Details of the map data 522 will be described later. The data stored in the storage unit 52 is not limited to the program 521 and the map data 522. As the storage unit 52, a ROM (Read Only Memory), a RAM (Random Access Memory) and the like are cited. The program 521 is not limited to being stored in the storage unit 52, but it may be stored in a recording medium which can be read by the calculation unit 51 in advance and distributed or it may be downloaded to the control unit 5 via a network. Moreover, the storage unit 52 may be an external storage device connected to the control unit 5.

The calculation unit 51 has a fuel injection-amount calculation unit 511, a system required-torque calculation unit 512, an engine required-torque calculation unit 513, a motor required-torque calculation unit 514, an operation-mode determination unit 515, and an engine control-parameter determination unit 516. The calculation unit 51 may have a target air-amount calculation unit (not shown) instead of or together with the fuel injection-amount calculation unit 511. The fuel injection-amount calculation unit 511, the system required-torque calculation unit 512, the engine required-torque calculation unit 513, the motor required-torque calculation unit 514, the operation-mode determination unit 515, the engine control-parameter determination unit 516, and the target air-amount calculation unit are realized by execution of the program 521 stored in the storage unit 52 by the calculation unit 51. The fuel injection-amount calculation unit 511, the system required-torque calculation unit 512, the engine required-torque calculation unit 513, the motor required-torque calculation unit 514, the operation-mode determination unit 515, the engine control-parameter determination unit 516, and the target air-amount calculation unit may be realized by hardware or may be realized by combination of the hardware and software.

The calculation unit 51 calculates a torque determining factor for determining the system required torque as the hybrid system 2 on the basis of at least either one of an accelerator opening degree detected by the accelerator opening-degree sensor 61 and a rotation-number signal transmitted by the hand accelerator 62. The torque determining factor includes the fuel injection amount of the engine 3 and the target air amount of the engine 3. In other words, the "fuel injection amount" and the "target air amount" in this embodiment are examples of the "torque determining factor" of the present invention. That is, the calculation unit 51 may calculate the fuel injection amount of the engine 3 or may calculate the target air amount of the engine on the basis of at least either one of an accelerator opening degree detected by the accelerator opening-degree sensor 61 and a rotation-number signal transmitted by the hand accelerator 62. In the following description, a case in which the "torque determining factor" is the "fuel injection amount" is cited as an example.

The fuel injection-amount calculation unit 511 calculates the fuel injection amount of the engine 3 on the basis of at least either one of an accelerator opening degree detected by the accelerator opening-degree sensor 61 and a rotation-number signal transmitted by the hand accelerator 62. That is, the fuel injection-amount calculation unit 511 can calculate the fuel injection amount of the engine 3 on the basis of the accelerator opening degree detected by the accelerator opening-degree sensor 61 or can calculate the fuel injection amount of the engine 3 on the basis of the rotation-number signal transmitted by the hand accelerator 62. Alternatively, the fuel injection-amount calculation unit 511 can calculate the fuel injection amount of the engine 3 on the basis of both the accelerator opening degree detected by the accelerator opening-degree sensor 61 and the rotation-number signal transmitted by the hand accelerator 62. Moreover, the fuel injection-amount calculation unit 511 calculates the fuel injection amount of the engine 3 on the basis of the operation mode of the hybrid system 2 determined by the operation-mode determination unit 515. As described above, the fuel injection amount of the engine 3 in this embodiment is an example of the "torque determining factor" of the present invention.

The system required-torque calculation unit 512 calculates the system required torque as the hybrid system 2. Specifically, the system required-torque calculation unit 512 calculates the system required torque on the basis of the rotation number of the engine 3 detected by the rotation sensor 31 and the fuel injection amount calculated by the fuel injection-amount calculation unit 511. For example, the system required-torque calculation unit 512 calculates the system required torque on the basis of the map data 522 indicating the relationship of the rotation number of the engine 3, the fuel injection amount of the engine 3, and the torque of the engine 3. The system required-torque calculation unit 512 is not limited to the calculation of the system required torque on the basis of the map data 522 but may calculate the system required torque on the basis of a formula, a graph or the like indicating the relationship of the rotation number of the engine 3, the fuel injection amount of the engine 3, and the torque of the engine 3, for example.

The engine required-torque calculation unit 513 calculates the engine required torque for the engine 3. Specifically, the engine required-torque calculation unit 513 calculates the engine required torque on the basis of the rotation number of the engine 3 detected by the rotation sensor 31 and the fuel injection amount calculated by the fuel injection-amount calculation unit 511. For example, the engine required-torque calculation unit 513 corrects the fuel injection amount calculated by the fuel injection-amount calculation unit 511 and calculates the engine required torque on the basis of the rotation number of the engine 3 detected by the rotation sensor 31 and the fuel injection amount after the correction. For example, the engine required-torque calculation unit 513 corrects the fuel injection amount calculated by the fuel injection-amount calculation unit 511 and then, calculates the engine required torque on the basis of the map data 522 indicating the relationship of the rotation number of the engine 3, the fuel injection amount of the engine 3, and the torque of the engine 3. The engine required-torque calculation unit 513 is not limited to the calculation of the engine required torque on the basis of the map data 522 but may calculate the engine required torque on the basis of a formula, a graph and the like indicating the relationship of the rotation number of the engine 3, the fuel injection amount of the engine 3, and the rotation number of the engine 3 after the fuel injection amount calculated by the fuel injection-amount calculation unit 511 is corrected, for example.

The motor required-torque calculation unit 514 calculates the motor required torque for the motor generator 41. Specifically, the motor required-torque calculation unit 514 calculates the motor required torque on the basis of the operation mode of the hybrid system 2 determined by the operation-mode determination unit 515. More specifically, the motor required-torque calculation unit 514 calculates the motor required torque on the basis of the system required torque calculated by the system required-torque calculation unit 512, the engine required torque calculated by the engine required-torque calculation unit 513, and the charging rate (SOC: State Of Charge) of the battery pack 42.

The operation-mode determination unit 515 determines the operation mode of the hybrid system 2. That is, the operation-mode determination unit 515 determines which of the operation modes, that is, the regeneration operation, the torque assist operation, and the torque split operation is to be performed as the operation mode of the hybrid system 2. Specifically, the operation-mode determination unit 515 determines the operation mode of the hybrid system 2 on the basis of the system required torque calculated by the system required-torque calculation unit 512, the engine required torque calculated by the engine required-torque calculation unit 513, and the charging rate of the battery pack 42. Alternatively, the operation-mode determination unit 515 determines the operation mode of the hybrid system 2 on the basis of the system required torque calculated by the system required-torque calculation unit 512, the engine required torque calculated by the engine required-torque calculation unit 513, the charging rate of the battery pack 42, and the rotation number of the engine 3 detected by the rotation sensor 31.

The engine control-parameter determination unit 516 determines the control parameter of the engine 3 on the basis of the fuel injection amount of the engine 3 calculated on the basis of the operation mode of the hybrid system 2 determined by the operation-mode determination unit 515 and the rotation number of the engine 3 detected by the rotation sensor 31. In other words, the engine control-parameter determination unit 516 determines the control parameter of the engine 3 on the basis of the fuel injection amount written back (that is, converted) on the basis of the operation mode of the hybrid system 2 determined by the operation-mode determination unit 515 and the rotation number of the engine 3 detected by the rotation sensor 31. As the control parameter of the engine 3, an injection pattern of the engine 3, an injection timing of the engine 3, and an EGR (Exhaust Gas Recirculation) valve opening degree and the like can be cited, for example.

The communication unit 53 conducts communication with the engine 3 including the rotation sensor 31, at least either one of the accelerator opening-degree sensor 61 and the hand accelerator 62, the motor generator 41, the battery pack 42, and the DC/DC converter 43 via an electric communication line and performs transmission/reception of various types of information and various signals.

Here, as described above in relation with FIG. 1 and FIG. 2, in the industrial machines such as the construction machine, the agricultural machine and the lawnmower, the generator, the compressor, the pump and the like, the configuration of the accelerator is different for each application. For example, there is an industrial machine of a model not including the accelerator pedal 65. In the industrial machine of the model not including the accelerator pedal 65, the operator gives instructions of certain engine rotation numbers by the hand accelerator 62. Moreover, in the industrial machines, relatively a few components other than the engine 3 have the ECU, and the required torque of the components other than the engine 3 is not known in relatively many cases. As described above, in the hybrid system 2 mounted on the industrial machines, the input factors which can be used when calculating the system required torque as the hybrid system 2 are limited as compared with the hybrid system mounted on automobiles.

On the other hand, the control unit 5 (specifically, the fuel injection-amount calculation unit 511) of the hybrid system 2 according to this embodiment calculates the fuel injection amount of the engine 3 on the basis of at least either one of the accelerator opening degree detected by the accelerator opening-degree sensor 61 and the rotation-number signal transmitted by the hand accelerator 62. Then, the control unit 5 (specifically, the system required-torque calculation unit 512) calculates the system required torque as the hybrid system 2 on the basis of the rotation number of the engine 3 detected by the rotation sensor 31 and the fuel injection amount of the engine 3 calculated by the fuel injection-amount calculation unit 511. Moreover, the control unit 5 (specifically, the engine required-torque calculation unit 513) calculates the engine required torque on the basis of the rotation number of the engine 3 detected by the rotation sensor 31 and the fuel injection amount calculated by the fuel injection-amount calculation unit 511. For example, the engine required-torque calculation unit 513 corrects the fuel injection amount calculated by the fuel injection-amount calculation unit 511 and calculates the engine required torque on the basis of the rotation number of the engine 3 detected by the rotation sensor 31 and the fuel injection amount after the correction.

According to the hybrid system 2 according to this embodiment, even when the hybrid system 2 is mounted on an industrial machine not including the accelerator pedal 65, for example, or even if the control unit 5 is not installed in the components other than the engine 3, the control unit 5 of this embodiment can calculate the more proper system required torque and engine required torque. As a result, the hybrid system 2 according to this embodiment can calculate the more proper system required torque and engine required torque while the input factors which can be used when calculating the system required torque are limited. Moreover, the control unit 5 (specifically, the operation-mode determination unit 515) can determine the more proper operation mode on the basis of the relationship between the system required torque and the engine required torque. As a result, the hybrid system 2 according to this embodiment can calculate the more proper operation mode while the input factors which can be used when determining the operation mode are limited.

Moreover, the control unit 5 (specifically, the operation-mode determination unit 515) determines the operation mode on the basis not only of the relationship between the system required torque and the engine required torque but further of the charging rate of the battery pack 42 connected to the motor generator 41. Therefore, the hybrid system 2 can determine the more proper operation mode while the input factors which can be used when determining the operation mode are limited.

Subsequently, the operation of the hybrid system according to this embodiment will be described by referring to the figures.

Figure 4:
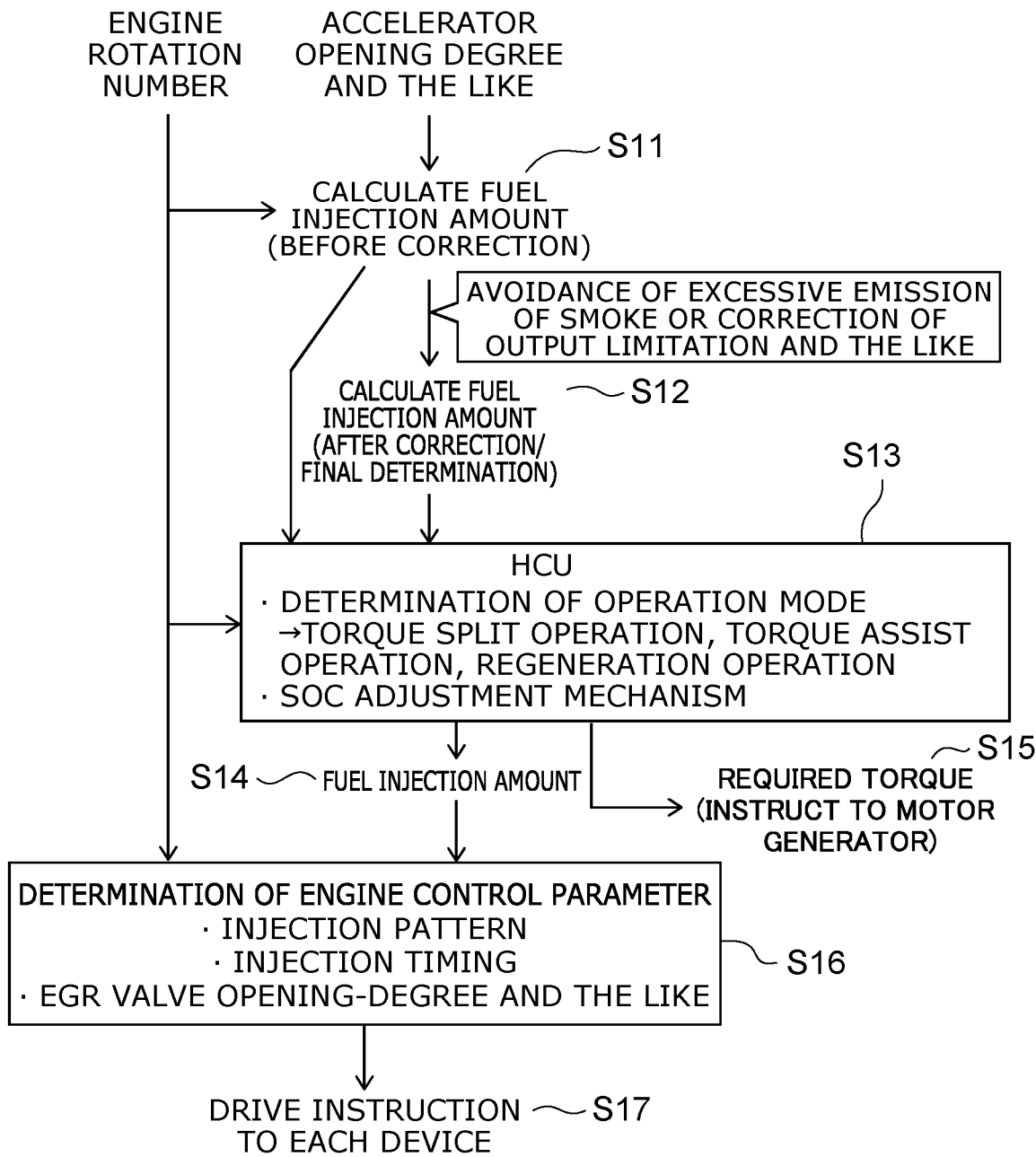
FIG. 4 is a flowchart illustrating an outline of an operation of the hybrid system according to this embodiment.

FIG. 4 is a flowchart illustrating an outline of the operation of the hybrid system according to this embodiment.

First, at Step S11, the fuel injection-amount calculation unit 511 calculates the fuel injection amount of the engine 3 on the basis of at least either one of the accelerator opening degree detected by the accelerator opening-degree sensor 61 and the rotation-number signal transmitted by the hand accelerator 62. The fuel injection amount calculated at Step S11 is the fuel injection amount before correction in order to avoid excessive emission of particulate matters (PM: Particulate Matter) contained in the exhaust gas or to avoid excess of a limit value by an output of the engine 3 is conducted. Then, the system required-torque calculation unit 512 calculates the system required torque on the basis of the rotation number of the engine 3 detected by the rotation sensor 31 and the fuel injection amount (that is, the fuel injection amount before the correction) calculated by the fuel injection-amount calculation unit 511.

Subsequently, at Step S12, the engine required-torque calculation unit 513 corrects the fuel injection amount calculated by the fuel injection-amount calculation unit 511 in order to avoid excessive emission of the particulate matters contained in the exhaust gas and to avoid excess of the limit value by the output of the engine 3 and finally determines the maximum fuel injection amount. Then, the engine required-torque calculation unit 513 calculates the engine required torque on the basis of the rotation number of the engine 3 detected by the rotation sensor 31 and the fuel injection amount after the correction.

Subsequently, at Step S13, the operation-mode determination unit 515 determines the operation mode (the regeneration operation, the torque assist operation, the torque split operation) of the hybrid system 2 on the basis of the system required torque calculated by the system required-torque calculation unit 512 and the engine required torque calculated by the engine required-torque calculation unit 513. Alternatively, the operation-mode determination unit 515 determines the operation mode of the hybrid system 2 on the basis of the system required torque calculated by the system required-torque calculation unit 512, the engine required torque calculated by the engine required-torque calculation unit 513, and the rotation number of the engine 3 detected by the rotation sensor 31. Moreover, the operation-mode determination unit 515 adjusts the charging rate of the battery pack 42 by determining the operation mode of the hybrid system 2 further on the basis of the charging rate (SOC) of the battery pack 42. The calculation and processing at Step S13 are executed by the HCU, for example.

Subsequently, at Step S14, the fuel injection-amount calculation unit 511 calculates the fuel injection amount of the engine 3 on the basis of the operation mode of the hybrid system 2 determined by the operation-mode determination unit 515. That is, the fuel injection-amount calculation unit 511 writes back (that is, converts) the fuel injection amount of the engine 3 on the basis of the operation mode of the hybrid system 2 determined by the operation-mode determination unit 515.

Moreover, at Step S15, the motor required-torque calculation unit 514 calculates the motor required torque on the basis of the operation mode of the hybrid system 2 determined by the operation-mode determination unit 515. Then, the control unit 5 transmits a signal related to the motor required torque calculated by the motor required-torque calculation unit 514 to the motor generator 41 and gives an instruction to the motor generator 41.

Subsequently, at Step S16, the engine control-parameter determination unit 516 determines the control parameter of the engine 3 on the basis of the fuel injection amount written back by the fuel injection-amount calculation unit 511 and the rotation number of the engine 3 detected by the rotation sensor 31.

Subsequently, at Step S17, the control unit 5 transmits a signal related to the control parameter determined by the engine control-parameter determination unit 516 and gives a drive instruction to each device.

According to the hybrid system 2 according to this embodiment, the control unit 5 corrects the fuel injection amount calculated by the fuel injection-amount calculation unit 511 and calculates the engine required torque on the basis of the rotation number of the engine 3 detected by the rotation sensor 31 and the fuel injection amount after the correction. As a result, when the rotation number of the engine 3 is lowered due to an overload or when rapid acceleration response is required, for example, the torque assist operation can be performed while the particulate matters contained in the exhaust gas are reduced.

Figure 5:
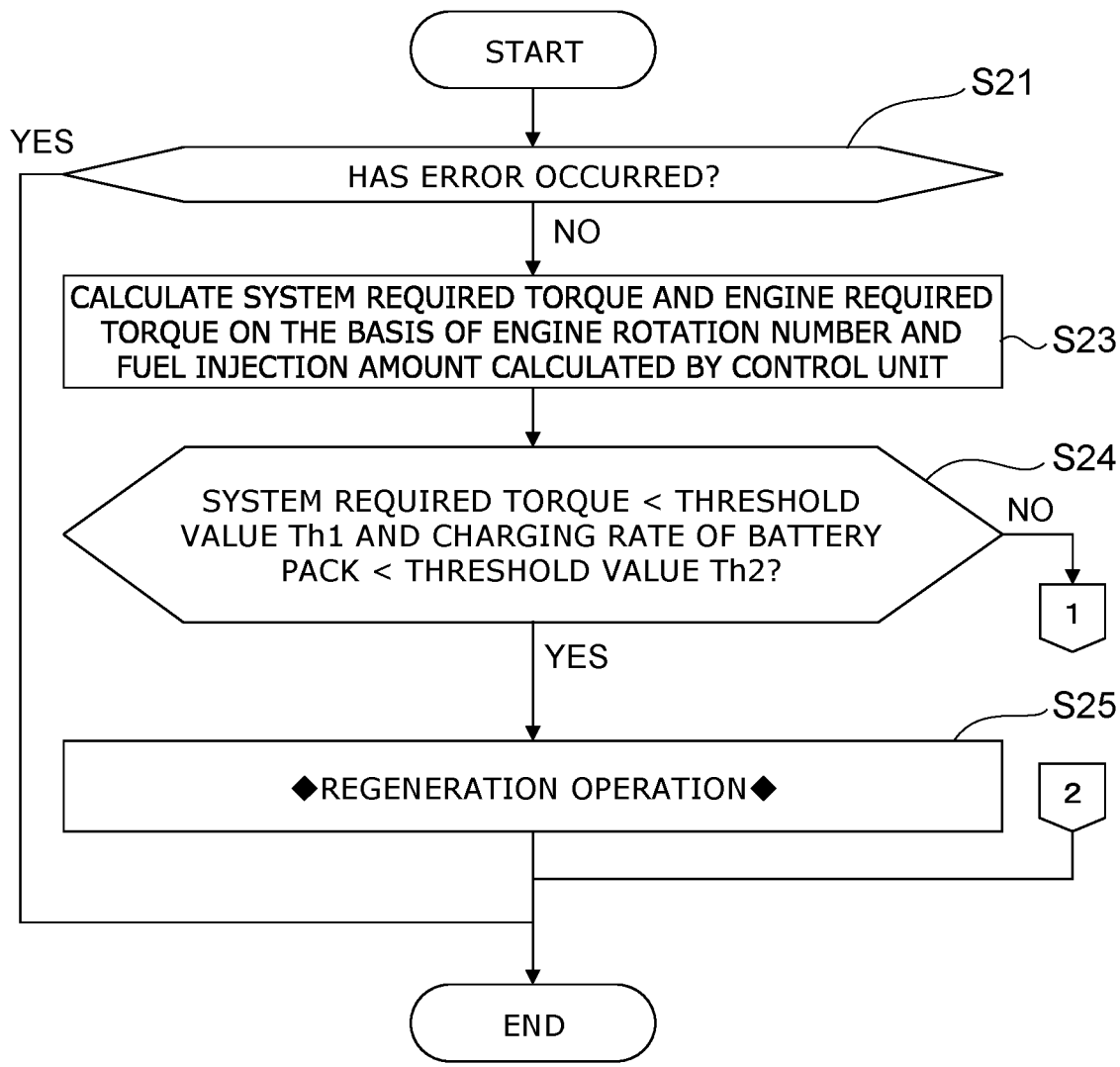
FIG. 5 is a flowchart illustrating a specific example of the operation of the hybrid system according to this embodiment.
Figure 6:
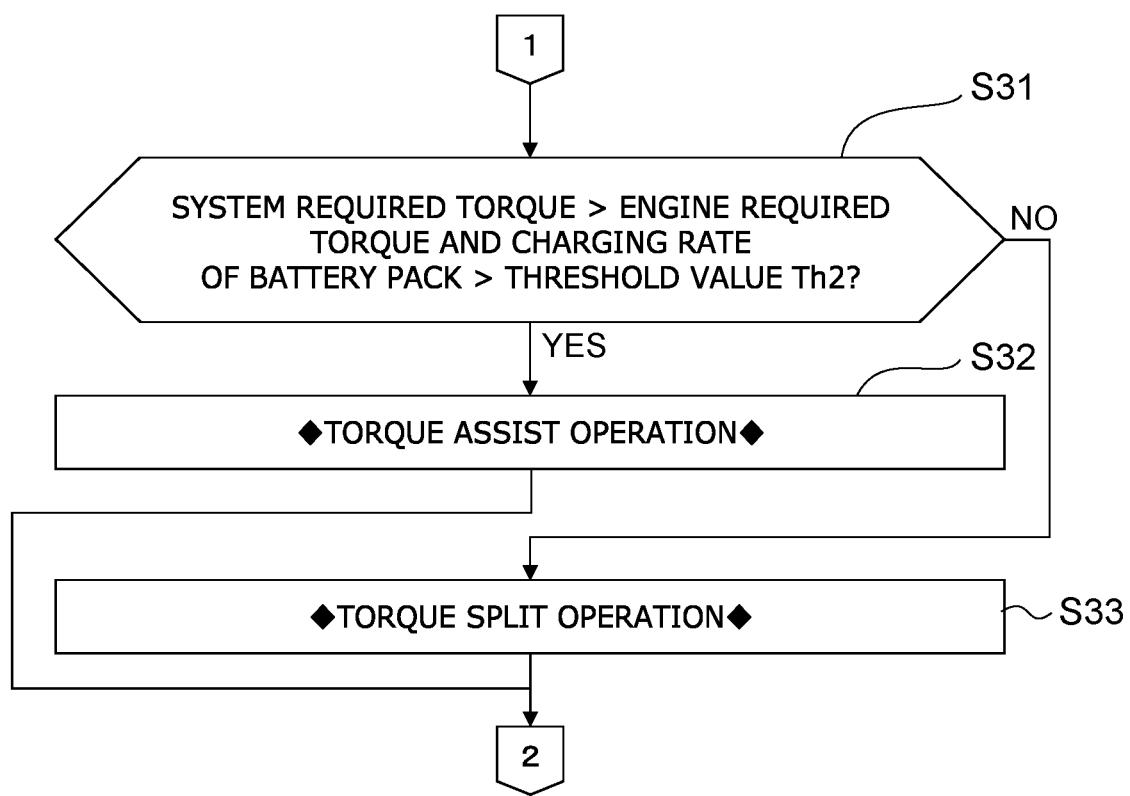
FIG. 6 is a flowchart illustrating a specific example of the operation of the hybrid system according to this embodiment.

FIG. 5 and FIG. 6 are flowcharts illustrating a specific example of the operations of the hybrid system according to this embodiment.

Figures 7, 8:
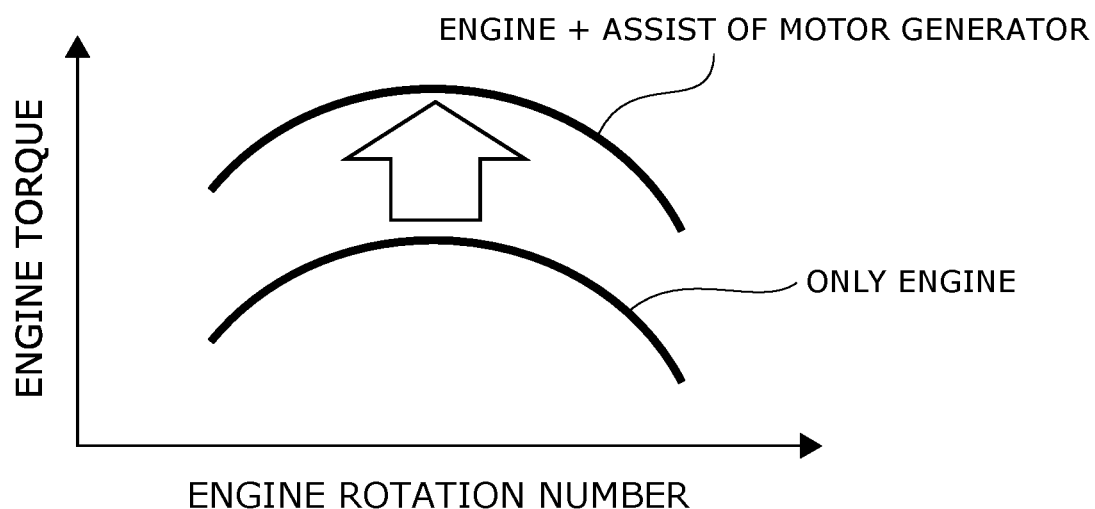
FIG. 7 is a table exemplifying map data of this embodiment.
FIG. 8 is a graph illustrating a torque curve of the hybrid system according to this embodiment.

FIG. 7 is a table exemplifying the map data in this embodiment.

As shown in FIG. 5, first, at Step S21, the control unit 5 determines whether an error has occurred in the hybrid system 2 or not. If an error has occurred in the hybrid system 2 (Step S21: YES), the control unit 5 ends the operation of the hybrid system 2.

If an error has not occurred in the hybrid system 2 (Step S21: NO), at Step S23, the fuel injection-amount calculation unit 511 calculates the fuel injection amount of the engine 3 on the basis of at least either one of the accelerator opening degree detected by the accelerator opening-degree sensor 61 and the rotation-number signal transmitted by the hand accelerator 62. Then, the system required-torque calculation unit 512 calculates the system required torque on the basis of the rotation number of the engine 3 detected by the rotation sensor 31 and the fuel injection amount (that is, the fuel injection amount before the correction) calculated by the fuel injection-amount calculation unit 511. Moreover, the engine required-torque calculation unit 513 corrects the fuel injection amount calculated by the fuel injection-amount calculation unit 511 and calculates the engine required torque on the basis of the rotation number of the engine 3 detected by the rotation sensor 31 and the fuel injection amount after the correction. The "fuel injection amount before the correction" and the "fuel injection amount after the correction" are as described above in relation with FIG. 4. The control unit 5 of this embodiment calculates the system required torque and the engine required torque on the basis of the map data 522 stored in the storage unit 52 in advance.

That is, the map data 522 shown in FIG. 7 is stored in the storage unit 52 (held in a storage), for example. In the map data 522 exemplified in FIG. 7, a lateral axis indicates the rotation number of the engine 3 and a vertical axis indicates the fuel injection amount of the engine 3. Moreover, in the map data 522 exemplified in FIG. 7, a portion where the lateral axis (engine rotation number) and the vertical axis (fuel injection amount) cross each other indicates the torque of the engine 3. That is, the map data 522 exemplified in FIG. 7 indicates the relationship of the rotation number of the engine 3, the fuel injection amount of the engine 3, and the torque of the engine 3.

On the lateral axis, a relatively right side is a side where the rotation number of the engine 3 is relatively high, and a relatively left side is a side where the rotation number of the engine 3 is relatively low. Moreover, on the vertical axis, a relatively lower side is a side where the fuel injection amount of the engine 3 is relatively larger, and a relatively upper side is a side where the fuel injection amount of the engine 3 is relatively smaller.

In the description of this embodiment, as shown in FIG. 7, a case in which the fuel injection-amount calculation unit 511 calculates a fuel injection amount Q8 of the engine 3 on the basis of at least either one of the accelerator opening degree detected by the accelerator opening-degree sensor 61 and the rotation-number signal transmitted by the hand accelerator 62 is cited as an example. The fuel injection amount Q8 is an example of the "fuel injection amount before the correction". Moreover, in the description of this embodiment, as shown in FIG. 7, a case in which the rotation sensor 31 detects a rotation number R3 of the engine 3 is cited as an example.

In this case, the system required-torque calculation unit 512 calculates a system required torque T38 on the basis of the rotation number R3 of the engine 3 and the fuel injection amount Q8 before the correction. Subsequently, the engine required-torque calculation unit 513 corrects the fuel injection amount Q8 calculated by the fuel injection-amount calculation unit 511 in order to avoid excessive emission of the particulate matters contained in the exhaust gas and to avoid excess of the limit value by the output of the engine 3 and finally determines a maximum fuel injection amount Q5. The fuel injection amount Q5 is an example of the "fuel injection amount after the correction". Subsequently, the engine required-torque calculation unit 513 calculates an engine required torque T35 on the basis of the rotation number R3 of the engine 3 and the fuel injection amount Q5 after the correction. As described above, the control unit 5 of this embodiment calculates the system required torque T38 and the engine required torque T35 on the basis of the map data 522 stored in the storage unit 52 in advance.

As shown in FIG. 5, at Step S24 subsequent to Step S23, the control unit 5 determines whether the system required torque T38 is smaller than a threshold value Th1 and the charging rate of the battery pack 42 is smaller than a threshold value Th2 or not. The threshold value Th1 of this embodiment is an example of the "first threshold value" of the present invention. The threshold value Th2 of this embodiment is an example of the "second threshold value" of the present invention.

At Step S24, when all the conditions of "system required torque T38<threshold value Th1" and of "charging rate of the battery pack 42<threshold value Th2" are satisfied (Step S24: YES), at Step S25, the operation-mode determination unit 515 determines the regeneration operation as the operation mode of the hybrid system 2 and performs the regeneration operation.

For example, when all the conditions of "system required torque T38<threshold value Th1" and of "charging rate of the battery pack 42<threshold value Th2" are satisfied such as when the industrial machine on which the hybrid system 2 is mounted goes down on a slope in a state of the acceleration off, at Step S25, the operation-mode determination unit 515 determines the regeneration operation as the operation mode of the hybrid system 2.

Then, at Step S25, the fuel injection-amount calculation unit 511 calculates the fuel injection amount of the engine 3 on the basis of the operation mode (regeneration operation at Step S25) of the hybrid system 2 determined by the operation-mode determination unit 515. Specifically, the fuel injection-amount calculation unit 511 sets the fuel injection amount of the engine 3 to zero. In other words, the engine required-torque calculation unit 513 sets the engine required torque to zero. Moreover, at Step S25, the motor required-torque calculation unit 514 calculates the motor required torque on the basis of the operation mode (regeneration operation at Step S25) of the hybrid system 2 determined by the operation-mode determination unit 515. Specifically, the motor required-torque calculation unit 514 calculates the motor required torque for charging the battery pack 42 by the motor generator 41. That is, the motor required-torque calculation unit 514 sets the motor required torque to zero.

On the other hand, at Step S24, if at least either one of the conditions of "system required torque T38<threshold value Th1" and of "charging rate of the battery pack 42<threshold value Th2" is not satisfied (Step S24: NO), at Step S31, the control unit 5 determines whether the system required torque T38 is larger than the engine required torque T35 and the charging rate of the battery pack 42 is larger than the threshold value Th2 or not.

At Step S31, when all the conditions of "system required torque T38>engine required torque T35" and of "charging rate of the battery pack 42>threshold value Th2" are satisfied (Step S31: YES), at Step S32, the operation-mode determination unit 515 determines the torque assist operation as the operation mode of the hybrid system 2 and performs the torque assist operation.

For example, when all the conditions of "system required torque T38>engine required torque T35" and of "charging rate of the battery pack 42>threshold value Th2" are satisfied such as when the industrial machine on which the hybrid system 2 is mounted goes up on a slope, and the rotation number of the engine 3 is lowered due to an overload or when the rapid acceleration response is required or the like, at Step S32, the operation-mode determination unit 515 determines the torque assist operation as the operation mode of the hybrid system 2.

Then, at Step S32, the fuel injection-amount calculation unit 511 calculates the fuel injection amount of the engine 3 on the basis of the operation mode (torque assist operation at Step S32) of the hybrid system 2 determined by the operation-mode determination unit 515. Moreover, at Step S32, the motor required-torque calculation unit 514 calculates the motor required torque on the basis of the operation mode (torque assist operation at Step S32) of the hybrid system 2 determined by the operation-mode determination unit 515. Specifically, the motor required-torque calculation unit 514 calculates the motor required torque on the basis of the difference between the system required torque T38 and the engine required torque T35. That is, the motor required-torque calculation unit 514 calculates the motor required torque for the motor generator 41 to assist the torque of the engine 3. As a result, the hybrid system 2 can improve a work by the industrial machine on which the hybrid system 2 is mounted.

On the other hand, at Step S31, if at least either one of the conditions of "system required torque T38>engine required torque T35" and of "charging rate of the battery pack 42>threshold value Th2" is not satisfied, or in other words, at least either one of the conditions of "system required torque T38≤engine required torque T35" and "charging rate of the battery pack 42≤threshold value Th2" is satisfied (Step S31: NO), at Step S33, the operation-mode determination unit 515 determines the torque split operation as the operation mode of the hybrid system 2 and performs the torque split operation.

For example, when at least either one of the conditions of "system required torque T38>engine required torque T35" and of "charging rate of the battery pack 42>threshold value Th2" is not satisfied such as when the industrial machine on which the hybrid system 2 is mounted travels on a flat ground, at Step S33, the operation-mode determination unit 515 determines the torque split operation as the operation mode of the hybrid system 2.

Then, at Step S33, the fuel injection-amount calculation unit 511 calculates the fuel injection amount of the engine 3 on the basis of the operation mode (torque split operation at Step S33) of the hybrid system 2 determined by the operation-mode determination unit 515. Moreover, at Step S33, the motor required-torque calculation unit 514 calculates the motor required torque on the basis of the operation mode (torque split operation at Step S33) of the hybrid system 2 determined by the operation-mode determination unit 515.

Specifically, a case in which the system required torque is 100 N·m, and the engine 3 can generate the torque of 150 N·m is cited as an example, for example. In this case, the fuel injection-amount calculation unit 511 calculates the fuel injection amount for generating the torque of 100 N·m in the engine 3, for example. Alternatively, the fuel injection-amount calculation unit 511 sets the fuel injection amount of the engine 3 to zero, and the motor required-torque calculation unit 514 calculates the motor required torque for the motor generator 41 to assist the torque of 100 N·m for the engine 3. Alternatively, the fuel injection-amount calculation unit 511 calculates the fuel injection amount for generating the torque of 50 N·m in the engine 3, and the motor required-torque calculation unit 514 calculates the motor required torque for the motor generator 41 to assist the torque of 50 N·m for the engine 3, for example. Alternatively, the fuel injection-amount calculation unit 511 calculates the fuel injection amount for generating the torque of 130 N·m in the engine 3, and the motor required-torque calculation unit 514 calculates the torque of excessive 30 N·m in the engine 3 as the motor required torque for charging the battery pack 42 by the motor generator 41, for example.

As described above, if at least either one of the conditions of "system required torque T38>engine required torque T35" and of "charging rate of battery pack 42>threshold value Th2" is not satisfied (Step S31: NO), the control unit 5 can bring the charging rate of the battery pack 42 closer to the target value by distributing the torque of the engine 3 and the torque of the motor generator 41.

Subsequently to Step S25, Step S32, and Step S33, the control unit 5 ends the operation of the hybrid system 2.

According to the specific examples described in relation with FIGS. 5 to 7, the control unit 5 corrects the fuel injection amount Q8 calculated by the fuel injection-amount calculation unit 511 and calculates the engine required torque T35 on the basis of the rotation number R3 of the engine 3 detected by the rotation sensor 31 and the fuel injection amount Q5 after the correction. As a result, when the rotation number of the engine 3 is lowered due to the overload or when the rapid acceleration response is required, for example, the torque assist operation can be performed while reducing the particulate matters contained in the exhaust gas.

Moreover, the control unit 5 calculates the system required torque T38 and the engine required torque T35 on the basis of the map data 522 stored in the storage unit 52 in advance. Therefore, the control unit 5 can calculate the more proper system required torque T38 and engine required torque T35 while reducing the processing time for calculating the system required torque T38 and the engine required torque T35.

Moreover, the control unit 5 determines the operation mode on the basis not only of the relationship between the system required torque T38 and the engine required torque T35 but further of the charging rate of the battery pack 42 connected to the motor generator 41. Therefore, the control unit 5 can determine the more proper operation mode while the input factors which can be used when determining the operation mode are limited.

FIG. 8 is a graph illustrating a torque curve of the hybrid system according to this embodiment.

The lateral axis of the graph shown in FIG. 8 indicates the rotation number of the engine 3. The vertical axis of the graph shown in FIG. 8 indicates the torque of the engine 3.

As shown in FIG. 8, the control unit 5 (specifically, the system required-torque calculation unit 512) of this embodiment calculates the system required torque larger than the torque generated only by the engine 3 in all the regions of the rotation number of the engine 3. That is, the control unit 5 executes the control in which the motor generator 41 assists or supports the torque of the engine 3 in order to generate the torque in a region which cannot be generated singularly by the engine 3 in all the regions of the rotation number of the engine 3. In other words, the control unit 5 does not execute the control in which the motor generator 41 assists or supports the torque of the engine 3 in the torque region which can be generated singularly by the engine 3.

Therefore, the control unit 5 can cause the system required torque larger than the torque generated only by the engine 3 to be generated by executing the torque-assist operation as the more proper operation mode even when the rotation number of the engine 3 is relatively low. As a result, the fuel consumption can be improved while suppressing the emission of the engine 3 and reducing the particulate matters contained in the exhaust gas.

The embodiment of the present invention has been described. However, the present invention is not limited to the aforementioned embodiment but is capable of various changes within a range not departing from the scope of claims. The configuration of the embodiment described above can be partially omitted or arbitrarily combined so as to be different from the above.

As described in relation with FIG. 3, the calculation unit 51 may calculate a target air amount as the torque determining factor for determining the system required torque. In this case, the calculation unit 51 calculates a target air amount of the engine 3 on the basis of at least either one of the accelerator opening degree detected by the accelerator opening-degree sensor 61 and the rotation-number signal transmitted by the hand accelerator 62. And the calculation unit 51 calculates the system required torque as the hybrid system 2 on the basis of the rotation number of the engine 3 detected by the rotation sensor 31 and the calculated target air amount of the engine 3. As a result, effects similar to the effects described in relation with the embodiment of the present invention can be obtained.

REFERENCE SIGNS LIST 2, 2A, 2B Hybrid system
3 Engine
5 Control unit
31 Rotation sensor
32 DOC
33 DPF
34 Transmission member
41 Motor generator
42 Battery pack
43 DC/DC converter
51 Calculation unit
52 Storage unit
53 Communication unit
61 Accelerator opening-degree sensor
62 Hand accelerator
65 Accelerator pedal
71 Power taking-out component
72 Lead battery
73 12-V load
511 Fuel injection-amount calculation unit
512 System required-torque calculation unit
513 Engine required-torque calculation unit
514 Motor required-torque calculation unit
515 Operation-mode determination unit
516 Engine control-parameter determination unit
521 Program
522 Map data
Q5, Q8 Fuel injection amount
R3 Rotation number
T35 Engine required torque
T38 System required torque
Th1, Th2 Threshold value

The invention claimed is:

1. A hybrid system mounted on an industrial machine, the hybrid system comprising:
a rotation sensor which detects a rotation number of an engine;
at least either one of an accelerator sensor which detects an operation amount of an accelerator pedal and a rotation-number instruction unit which transmits a rotation-number signal instructing a certain rotation number to the engine; and
a control unit which controls an operation of the engine, wherein
the control unit executes control of calculating a torque determining factor for determining a system required torque as the hybrid system on the basis of at least either one of the operation amount of the accelerator pedal and the rotation-number signal transmitted by the rotation-number instruction unit, and control of calculating the system required torque on the basis of the rotation number detected by the rotation sensor and the calculated torque determining factor.

2. The hybrid system according to claim 1, wherein the torque determining factor is a fuel injection amount of the engine.

3. The hybrid system according to claim 2, wherein the control unit corrects the calculated fuel injection amount and calculates an engine required torque for the engine on the basis of the rotation number detected by the rotation sensor and the fuel injection amount after the correction.

4. The hybrid system according to claim 3, wherein the control unit stores, in advance, map data indicating a relationship among the rotation number of the engine, the fuel injection amount, and the torque of the engine and calculates the engine required torque on the basis of the map data stored in advance.

5. The hybrid system according to claim 2, wherein the control unit stores, in advance, map data indicating a relationship among the rotation number of the engine, the fuel injection amount, and the torque of the engine and calculates the system required torque on the basis of the map data stored in advance.

6. The hybrid system according to claim 1, wherein the control unit calculates the system required torque, which is larger than a torque generated only by the engine.

7. A hybrid system mounted on an industrial machine, the hybrid system comprising:
a rotation sensor which detects a rotation number of an engine;
at least either one of an accelerator sensor which detects an operation amount of an accelerator pedal and a rotation-number instruction unit which transmits a rotation-number signal instructing a certain rotation number to the engine; and
a control unit which controls an operation of the engine, wherein
the control unit executes control of calculating a torque determining factor for determining a system required torque as the hybrid system on the basis of at least either one of the accelerator opening degree detected by the accelerator opening-degree sensor and the rotation-number signal transmitted by the rotation-number instruction unit, control of calculating the system required torque and an engine required torque for the engine on the basis of the rotation number detected by the rotation sensor and the calculated torque determining factor, and control of determining an operation mode on the basis of a relationship between the system required torque and the engine required torque.

8. The hybrid system according to claim 7, wherein the torque determining factor is a fuel injection amount of the engine.

9. The hybrid system according to claim 8, wherein the control unit corrects the calculated fuel injection amount and calculates the engine required torque on the basis of the rotation number detected by the rotation sensor and the fuel injection amount after the correction.

10. The hybrid system according to claim 8, wherein the control unit stores, in advance, map data indicating a relationship among the rotation number of the engine, the fuel injection amount, and the torque of the engine and calculates the system required torque and the engine required torque on the basis of the map data stored in advance.

11. The hybrid system according to claim 7, wherein the control unit executes control of determining the operation mode further on the basis of a charging rate of a battery connected to a motor generator.

12. The hybrid system according to claim 11, wherein when the system required torque is smaller than a first threshold value, and when the charging rate is smaller than a second threshold value, the control unit sets the engine required torque to zero, calculates the motor required torque for the motor generator, and determines a regeneration operation for charging the battery by the motor generator to be the operation mode.

13. The hybrid system according to claim 11, wherein when the system required torque is larger than the engine required torque, and when the charging rate is larger than a second threshold value, the control unit calculates the motor required torque for the motor generator on the basis of a difference between the system required torque and the engine required torque and determines a torque assist operation, in which the motor generator assists a torque of the engine, to be the operation mode.

14. The hybrid system according to claim 11, wherein in at least either one of a case when the system required torque is equal to or less than the engine required torque, and a case when the charging rate is equal to or less than a second threshold value, the control unit calculates the motor required torque for the motor generator in accordance with the charging rate, and determines a torque split operation for bringing the charging rate closer to a target value by distributing the torque of the engine and the torque of the motor generator to be the operation mode.

15. The hybrid system according to claim 7, wherein the control unit calculates the system required torque, which is larger than a torque generated only by the engine.

\* \* \* \* \*